(12) United States Patent
Brandon et al.

(10) Patent No.: US 7,076,128 B2
(45) Date of Patent: Jul. 11, 2006

(54) SAFETY PROCEDURE FOR OPTICAL FIBER SYSTEMS AND SAFETY INTERFACE TO CARRY OUT SUCH SAFETY PROCEDURE

(75) Inventors: Eric Brandon, Bourg-la-Reine (FR); Laurent Labrunie, Paris (FR); Jean-Pierre Blondel, Buc (FR); François Boubal, Paris (FR); Laurence Buet, Paris (FR); Vincent Havard, Choisy-le-Roi (FR); Patrice Le Roux, Villebon-sur-Yvette (FR)

(73) Assignee: Alcatel, Paris (FR)

( * ) Notice: Subject to any disclaimer, the term of this patent is extended or adjusted under 35 U.S.C. 154(b) by 95 days.

(21) Appl. No.: 10/327,102

(22) Filed: Dec. 24, 2002

(65) Prior Publication Data
US 2003/0152317 A1   Aug. 14, 2003

(30) Foreign Application Priority Data
Feb. 11, 2002 (EP) .................................. 02360060

(51) Int. Cl.
*G02B 6/28* (2006.01)
(52) U.S. Cl. ...................................................... 385/24
(58) Field of Classification Search .................. 385/24, 385/12; 359/341.43–341.44
See application file for complete search history.

(56) References Cited

U.S. PATENT DOCUMENTS

| | | | | |
|---|---|---|---|---|
| 5,355,250 A | * | 10/1994 | Grasso et al. | 359/341.44 |
| 5,748,813 A | * | 5/1998 | Cassidy et al. | 385/24 |
| 5,859,725 A | | 1/1999 | Sugiya et al. | |
| 5,966,206 A | * | 10/1999 | Jander | 356/73.1 |
| 6,079,882 A | * | 6/2000 | Chien | 385/88 |
| 6,163,394 A | * | 12/2000 | Webb | 398/185 |
| 6,191,854 B1 | * | 2/2001 | Grasso et al. | 356/341 |
| 6,208,441 B1 | * | 3/2001 | Jones et al. | 398/87 |
| 6,243,195 B1 | * | 6/2001 | Pedersen et al. | 398/9 |
| 6,317,255 B1 | * | 11/2001 | Fatehi et al. | 359/341.44 |
| 6,344,915 B1 | * | 2/2002 | Alexander et al. | 398/115 |
| 6,423,963 B1 | * | 7/2002 | Wu | 250/227.14 |
| 6,480,326 B1 | * | 11/2002 | Papernyi et al. | 359/334 |
| 6,507,679 B1 | * | 1/2003 | Hodgson et al. | 385/12 |
| 6,547,453 B1 | * | 4/2003 | Stummer et al. | 385/88 |
| 6,583,899 B1 | * | 6/2003 | Casanova et al. | 398/9 |
| 6,661,947 B1 | * | 12/2003 | Shirai | 385/24 |

(Continued)

FOREIGN PATENT DOCUMENTS

EP        0865173 A2   9/1998

(Continued)

*Primary Examiner*—Michael G. Lee
*Assistant Examiner*—Edwyn Labaze
(74) *Attorney, Agent, or Firm*—Sughrue Mion, PLLC

(57) ABSTRACT

The invention refers to a safety procedure for optical fiber systems. Such systems are widely used in telecommunication to transport optical signals between a transmitter terminal and a receiver terminal. By the invented safety procedure the optical input power fed into said optical fiber system is automatically shut off or at least reduced in case of an unintended escape of light from at least one fiber. A safety interface, provided in the transmission line detects changes of the total optical output power in at least one fiber and initiates a shut-down of the input power as soon as a decrease of the total output power is detected, that exceeds a predefined value within a predefined time window. Thus the slope of the total output power is measured and evaluated rather than its absolute value.

9 Claims, 4 Drawing Sheets

U.S. PATENT DOCUMENTS

| | | | |
|---|---|---|---|
| 6,681,079 B1 * | 1/2004 | Maroney | 398/15 |
| 6,785,456 B1 * | 8/2004 | Bickham et al. | 385/123 |
| 2004/0081421 A1 * | 4/2004 | Mori et al. | 385/140 |

FOREIGN PATENT DOCUMENTS

EP            1182809 A2      2/2002

* cited by examiner

US 7,076,128 B2

SAFETY PROCEDURE FOR OPTICAL FIBER SYSTEMS AND SAFETY INTERFACE TO CARRY OUT SUCH SAFETY PROCEDURE

BACKGROUND OF THE INVENTION

The invention is based on a priority application EP 02 360 060.4 which is hereby incorporated by reference.

The invention refers to a safety procedure for optical fiber systems transporting optical signals between a transmitter terminal and a receiver terminal, with at least one pump source to enhance said optical signal, by which safety procedure the optical input power fed into said optical fiber system is automatically shut off or at least reduced in case of an unintended escape of light from at least one fiber, wherein a safety interface is provided in the transmission line, said interface detecting changes of the total optical output power in at least one fiber to be received by said receiver terminal and initiating a shut-down of said input power as soon as a decrease of said total output power exceeding a predefined value is detected within a predefined time window as well as to an safety interface used to carry out such safety procedure, transporting optical signals between a transmitter terminal and a receiver terminal, with at least one pump source to enhance said optical signal, wherein said safety interface to be provided in the transmission line is capable of detecting changes of the total optical output power per fiber to be received by said receiver terminal and generating an initiating signal for a shut-down of the optical input power fed into said optical fiber system as soon as it detects a decrease of said total output power exceeding a predefined value within a predefined time window.

Especially in telecommunication fiber systems are used to transport optical signals over long distances. Such systems usually consist of reinforced cables carrying a number of individual fibers. Over long distances an important degradation of the signal to be transported can be observed. Several different approaches have successfully been undertaken to solve this problem leading to very different mechanisms. All these solutions have in common, that high optical powers are transported by the fiber, which exceed by far the hazardous threshold of the human eye. Additionally the radiation normally used in optical telecommunication belongs to the infrared portion of the electromagnetic spectrum. These long wavelengths are invisible for the human eye. This makes the radiation even more dangerous, because, when the eye is hit by such radiation, the eye closing reflex, which is based on the optical reception, cannot work properly. On the other hand the infrared radiation is very well absorbed by the aequous content of the eye, which can, hence, easily be destroyed.

Usually the radiation transported remains within the fiber system. The radiation loss leaking out of the fibers by evanescent waves is rather small and remains within the cable's optical insulation. Also the connectors between different parts of the cable or the cable and functional stations like transmitters, receivers, repeaters etc. usually are optically safe. However, an unintended escape of light from the fiber system is still possible e.g. in the case of a cable break, an equipment failure or an unintended connector unplugging. In order to avoid eye damages of persons closed to such a failure location it is necessary to provide for some safety mechanisms, which lead to an automatic shut-down of the optical power fed into the fiber. This power shall be called "total input power" in the following. The total input power consists of the signal power and any other optical power, that is fed into the system, like, for example, the pump power from pump sources in amplifier or repeater stations. A shut-down of the total input power is to be understood as complete shut-off or at least a serious reduction of the total power input, so that the light escaping from the failure location decreases rapidly under the hazardous threshold of the human eye.

The "ITU-T Recommendation G.664 (June 1999)" of the International Telecommunication Union (ITU) concerning "Optical safety procedures and requirements for optical transport systems" suggests several safety mechanisms for automatic saftety shut-down. They are all based on systems of antiparallel fiber pairs with several repeater or amplifier stations between their two main terminals (called "east" and "west" terminal). Each station contains a receiver element receiving the output power of the preceeding fiber section and a transmitter element feeding the improved signal into the succsessive fiber section. (The term "total output power" will be used in the following for the total power at the output of a fiber, i.e. the input of a receiver, be it an receiver element of an intermediate station, be it the main receiver at the main terminal. The signals of the two fibers of one pair travel in opposite directions. If there are N stations between the east terminal and the west terminal, the nth station of the east/west fiber ("station $(n)_1$") is located in the same housing as the (N-n+1)th station of the antiparallelly paired west/east fiber ("station $(N-n+1)_2$"). If for example a fiber break occurs in the section between the station $(n)_1$ and $(n+1)_1$, viewed along the east/west direction, the total optical output power of the affected section, i.e. the optical power received by the receiver $(n+1)_1$ drops down to almost zero. It is easy to provide the receiver elements with measuring means to detect a drop of power under a predefined threshold. In this case the transmitter $(N-n)_2$ of the second fiber (west/east), which is located in the same housing as the receiver $(n+1)_1$ of the first fiber (east/west), is automatically shut down. This causes a drop to almost zero of the energy received by station $(N-n+1)_2$, which is the nearest station viewed along the west/east direction. The receiver element $(N-n+1)2$ is located in the same housing as the transmitter element $(n)_1$, which feeds energy into the broken fiber section. The station $(n)_1/(N-n+1)_2$ is provided with the same automatic shut-down mechanism as the station $(n+1)_1/(N-n)_2$ mentioned before. Hence, the transmitter (n), is shut down and no hazardous light can escape from the broken fiber any more.

One drawback of this state of the art is its obvious restriction to antiparallel fiber pairs. Furthermore the safety procedure described can only be used in systems with a number of regenerator station between the east and the west terminal. In submarine systems, however, it is an important object to avoid such regenerator station for obvious reasons of maintainance. Such systems are rather provided with extremely strong pump sources near the main receiver terminal. These pump sources fed high amounts of light into the fibers in order to amplify the signal by means of Raman amplification or laser amplification in amplifier sections of the fiber, e.g. erbium-doped fiber sections. The pump light transported in the fiber together with the signal creates a large noise. As a consequence the total output power of the fiber received by the receiver terminal does not drop to a value closed to zero in case of a fiber failure. Rather a high value of noise is still measured. It is, thus, difficult to detect a cable break by a simple measurement of the total optical output power as it can be done in the state of the art cited before. Another serious problem is caused by the natural fluctuations of the pump energy. These fluctuations cause fluctuations of the absolute amount of noise as well as in the amplification gain of the signal. The resulting fluctuation of the total optical output power can by far exceed the changes of the total optical output power, which would result from a loss of signal, i.e. from a fiber break for example. The following table shows some typical values of the total optical output power at the receiver input and the pure signal power at the receiver input as a function of the pump power fed into the system.

| pump power [mW] | total optical output power at receiver input (dBm) | signal power at receiver input (dBm) |
|---|---|---|
| 800 | −8.0 | −10.3 |
| 1000 | −2.0 | −4.0 |
| 1100 | +1.5 | −0.2 |

In typical systems the pump power can easily fluctuate between the values shown in col. 1 of the table, which corresponds to a fluctuation of about 1.4 dB. As can be seen from col. 2 of the table, these pump power fluctuations cause fluctuation in the total optical output power of about 9.5 dB. From col. 3 of the table it can be read, that the signal power, which also fluctuates by about 9.5 dB, only makes a little more than half the total output power, namely about 2 dB less than the total output power. This means, that from a decrease of the total optical output power of 2 dB detected by the receiver, it cannot be decided, if a cable break, leading to a loss of signal, has occured or if a natural fluctuation of the pump power has been observed. The safety procedures according to the state of the art cited before can, thus, not be applied to unrepeatered fiber systems as they are desirable to use in submarine telecommunication systems.

On the other hand it can be seen from the table, that the pump power fed into the fiber exceeds the total output power by several orders of magnitude. Apart from the noise portion, this power travels in the opposite direction of the optical signal. However, in case of a fiber break this very high and hazardous power escapes from the broken fiber. Thus, in unrepeatered systems a reliable safety mechanism is even more crucial, than in systems with regeneration station every tens of kilometers, where no such high pump powers travel throuh the fiber.

As a partial remedy to this problem a loop back input to the pump station is used: some tens of kilometers away from the pump station a portion of the pump light traveling away from the receiver terminal, is coupled out and fed back into a receiver element located in the pump station. If a fiber failure occurs within the looped section, the pump power fed back to the pump station will dramatically drop and initiate a shut-down of the pump source. The drawbacks of such systems are evident. Only failures within the looped section are covered by this safety mechanism. On the other hand the loop cannot be extended over the whole lenght of the fiber line, because almost no feed back signal would be left after such a long travel. For this reasons usualy only the land section of the fiber line, i.e. the section between the beach line and the land based receiver terminal, is covered by the safety loop. Also within the loop the number of fibers in the cable has to be doubled. This is, together with the optical couplers necessary for coupling out the feed back portion, economically rather unfavourable.

SUMMARY OF THE INVENTION:

It is a particular object of the invention, to provide a safety shut-down mechanism applicable even for unrepeaterd systems with high power pump sources, that reliably shuts off or at least reduces the optical power escaping unintendedly from a defective fiber line. The safety mechanism should cover failures of almost the whole fiber line including its land section as well as its submarine section. At the same time the safety mechanism should be economically advantageous over existing solutions.

To this end the safety procedure according to claim 1 is suggested. A safety interface to be advantageously used for the application of the invented procedure is claimed in the independent claim 9.

According to claim 1 it is suggested to provide a special safety interface. This safety interface is capable of detecting changes of the total optical output power to be received by the receiver terminal. Depending on the special layout of the fiber system, two important values are predefined: A time window $\Delta t$ and a maximum power decrease value $\Delta P_{max}$. If a decrease of the total optical output power exceeding $\Delta P_{max}$ is detected within $\Delta t$, a signal is generated by the safety interface, that initiates a shut-down of the input power, e.g. a shut-off of the pump source. This invention is based on the observation, that the fluctuations of the pump power and, thus, the fluctuations of the total output power resulting from the pump power fluctuations as shown in the table above, occur in quite a slow way, typically in the order of hours. On the other hand a drop of total output power resulting from a fiber break or a sudden unplugging of a connector is very rapid event, typically in the order of msecs. As explained above, a fiber break cannot be reliably distinguished from a natural fluctuation by the simple measurement of the total output power. But it it very well possible to distiguish one from the other by a measurement of the slope of the power decay. This is the insight, on which the invention is based.

The advantages of the procedure according to the invention are obious. The suggested procedure does not take advantage of a special design of intermediate regenerator stations. It is, hence, applicable to unrepeatered systems as well as to systems, that do not have an antiparallel pairing of fibers. Also, the safety mechanism according to the invention works reliably no matter, where the failure is located. Finally, it is not necessary to spoil valuable material for expensive loop constructions.

BRIEF DESCRIPTION OF THE DRAWINGS

Further advantages of the invention can be read from the dependent claims, and the concrete part of the description. For a better understanding the invention as well as the state of the art have been schematically depicted in the drawing. The figures show:

Figure 1:
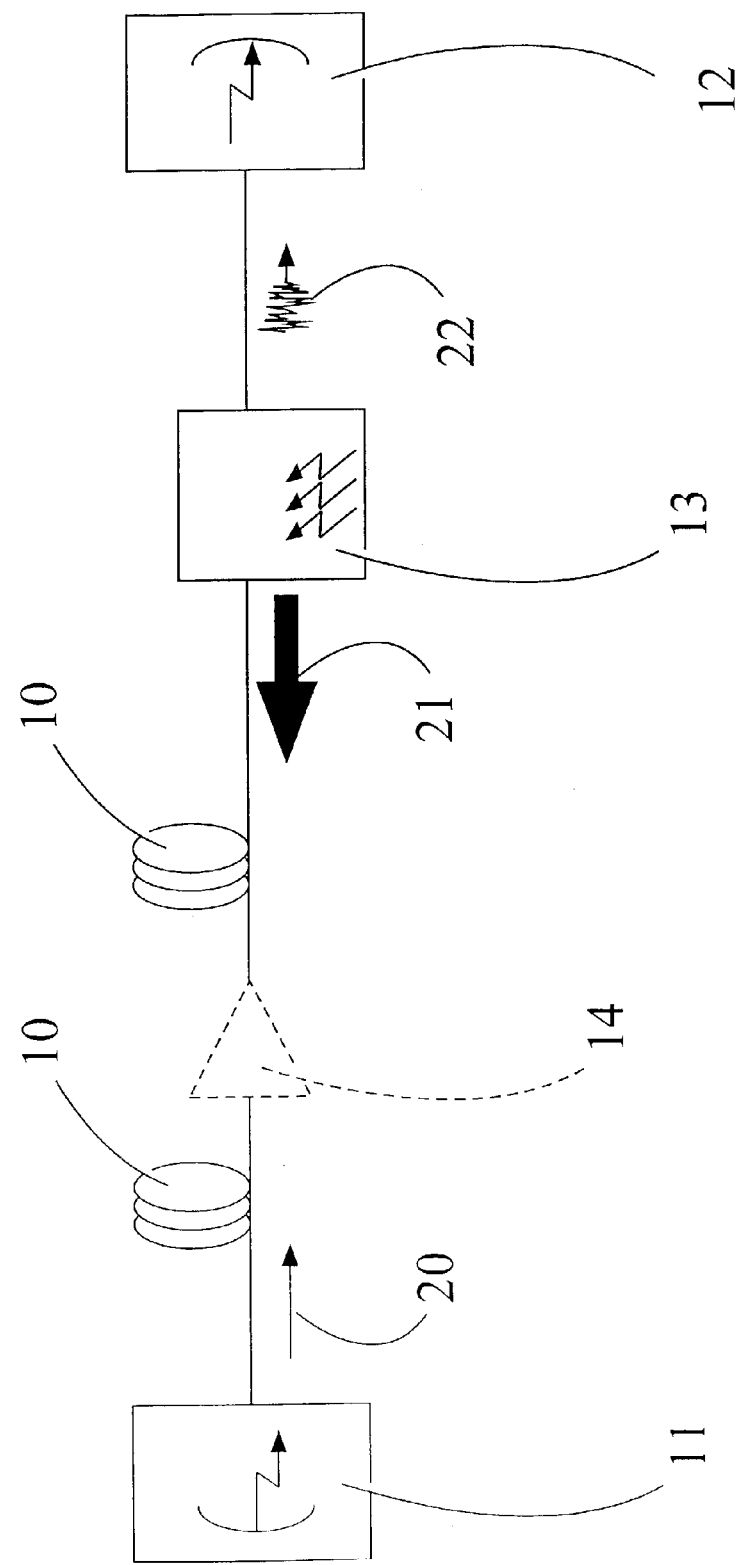
FIG. 1: a schematical drawing of an unrepeatered fiber system configuration with no safety mechanism provided.

DETAILED DESCRIPTION OF THE INVENTION:

FIG. 1 shows a basic configuration of an unrepeated telecommunication fiber system with no safety mechanism provided. The transmitter terminal 11 launches an optical signal 20 into the fiber 10. At the other end of the fiber line the signal is received by the receiver terminal 12. Not far away from the receiver terminal 12 there is a pump station 13 connected to the fiber line 10. Very strong pump sources feed the pump power 21 into the fiber line 10. The pump power 21 travels through the fiber line 10 in the opposite direction of the signal 20. The pump energy is used to enhance the signal 20 on its way through the fiber line 10 by means of Raman amplification or by laser amplification, if according amplification means 14 are provided along the fiber line 10. E.g. a section of erbium doped fiber could serve as such amplification means 14. This configuration has got the advantage, that no regenerator or repeater stations are needed along the fiber line 10. As the amplification means 14 are optional, they are depicted by dashed lines in FIG. 1. The system is especially suited for submarine applications. One unfavorable effect of the strong pump source 13 is the generation of a large noise, which superposes the signal 20 to be received by the receiver terminal 12. The total output power, that reaches the receiver terminal 12, is labeled by reference number 22 in FIG. 1.

Figure 2:
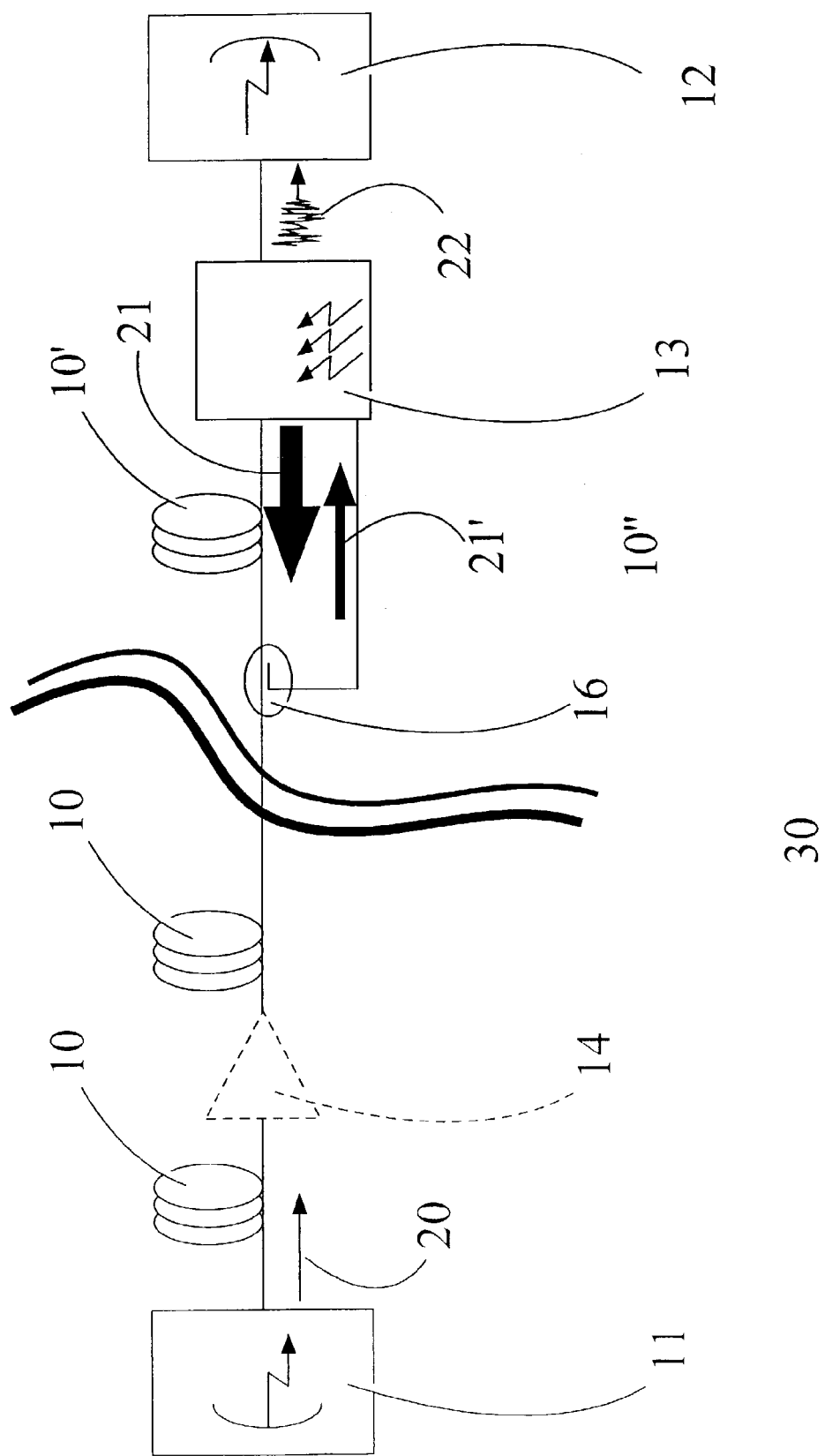
FIG. 2: a schematical drawing of an unrepeatered fiber system configuration provided with a safety mechanism according to the state of the art.

In FIG. 2 a configuration, provided with a safety mechanism according to the state of the art is depicted. The land section 10' of the fiber line builds, together with the feed back line 10" a loop structure. A fraction 21' of the pump light 21 is coupled out from the fiber line 10' by means of an optical coupler 15 an fed back to the pump station 13. A receiving element, not shown in FIG. 5, continously measures the fed back pump light 21'. In case of a fiber break within the land section 10' of the fiber line, the pump light in the feed back loop decreases drastically and the pump source 13 can be shut down. As explained before, the main drawback of this state of the art is the fact, that only a small section of the fiber line, usually the section between the pump station 13 and the beach line 30, is covered by the safety mechanism. Also, the additional expenditure of material makes this configuration quite expensive. However, this configuration is independent of the fluctuations of the pump source 13.

Figure 3:
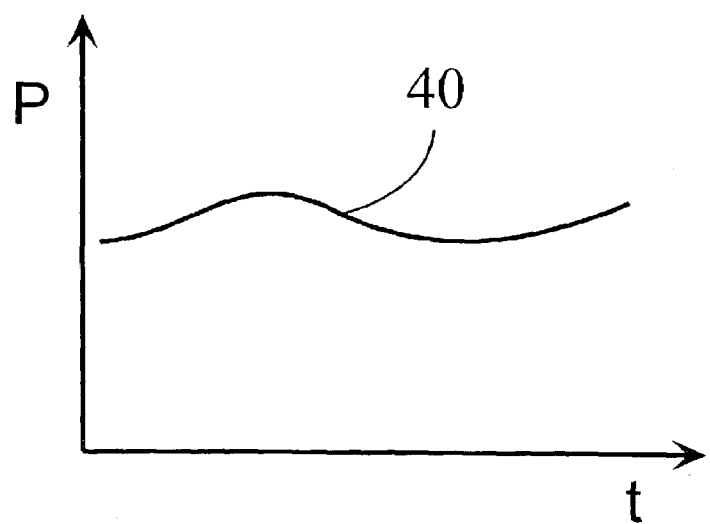
FIG. 3: a schematical drawing of typical pump fluctuations as a function of time.
Figure 4:
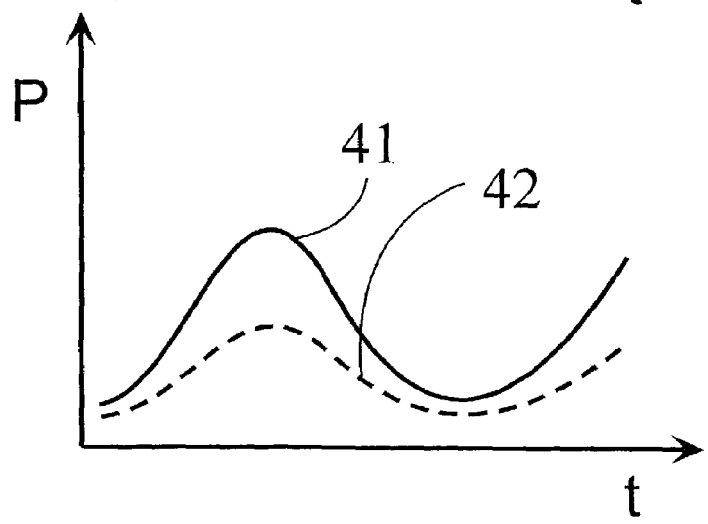
FIG. 4: a schematical drawing of typical fluctuations of the total output power and the noise power resulting from the pump power fluctuations depicted in FIG. 3 as a function of time.

The pump sources 13 usually suffer from natural power fluctuation. These fluctuations are schematically sketched in FIG. 3. The graph represents the pump power 40 as a function of time. The time scale t in FIG. 3 covers several hours. The fluctuations of the pump power 40 directly influence the level of noise power 42, as symbolized by the dashed line in FIG. 4. On the other hand also the gain of the signal enhancement depends on the the pump power 40. Thus, both parts of the total output power 41 (the solid line in FIG. 4), namely the enhanced signal as well as the noise 42 are fluctuating. Because of the non-linear dependencies of the signal enhancement gain on the pump power 40 the the enhanced signal usually depends somewhat stronger on the pump power level than the noise 42. This leads to an improvement of the signal-to-noise-ratio when the pump power 40 is increased. Nevertheless, the resulting fluctuations of the total output power 41 do not allow a reliable decision if a decrease, detected by its absolute value, is due to a natural fluctuation or if it is due to a failure of the fiber line 10, which would lead to a loss of signal, while the noise level 42 would still be measured.

Figure 5:
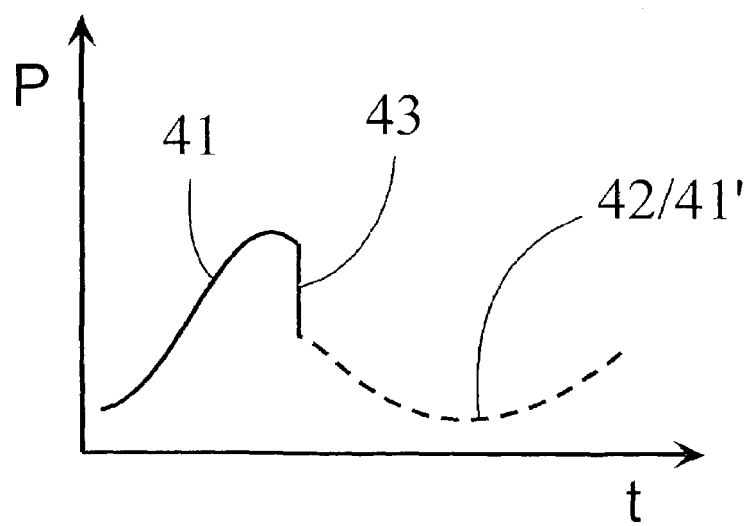
FIG. 5: a schematical drawing of the total output power in case of a fiber failure, FIG. 6 a schematical drawing of an unrepeatered fiber system configuration provided with a safety mechanism according to the invention.

However, as shown in FIG. 5 the difference between a fiber break and a natural fluctuation can be detected, if not the absolute value of a decrease of the total output power 41 is measured, but rather the slope of the decrease. While the natural fluctuations are rather slow processes, a failure of the fiber line results in a very sudden decrease 43 from a high level of the total output power 41, consisting of signal and noise, to a lower level 41', which equals the level of pure noise 42.

Figure 6:
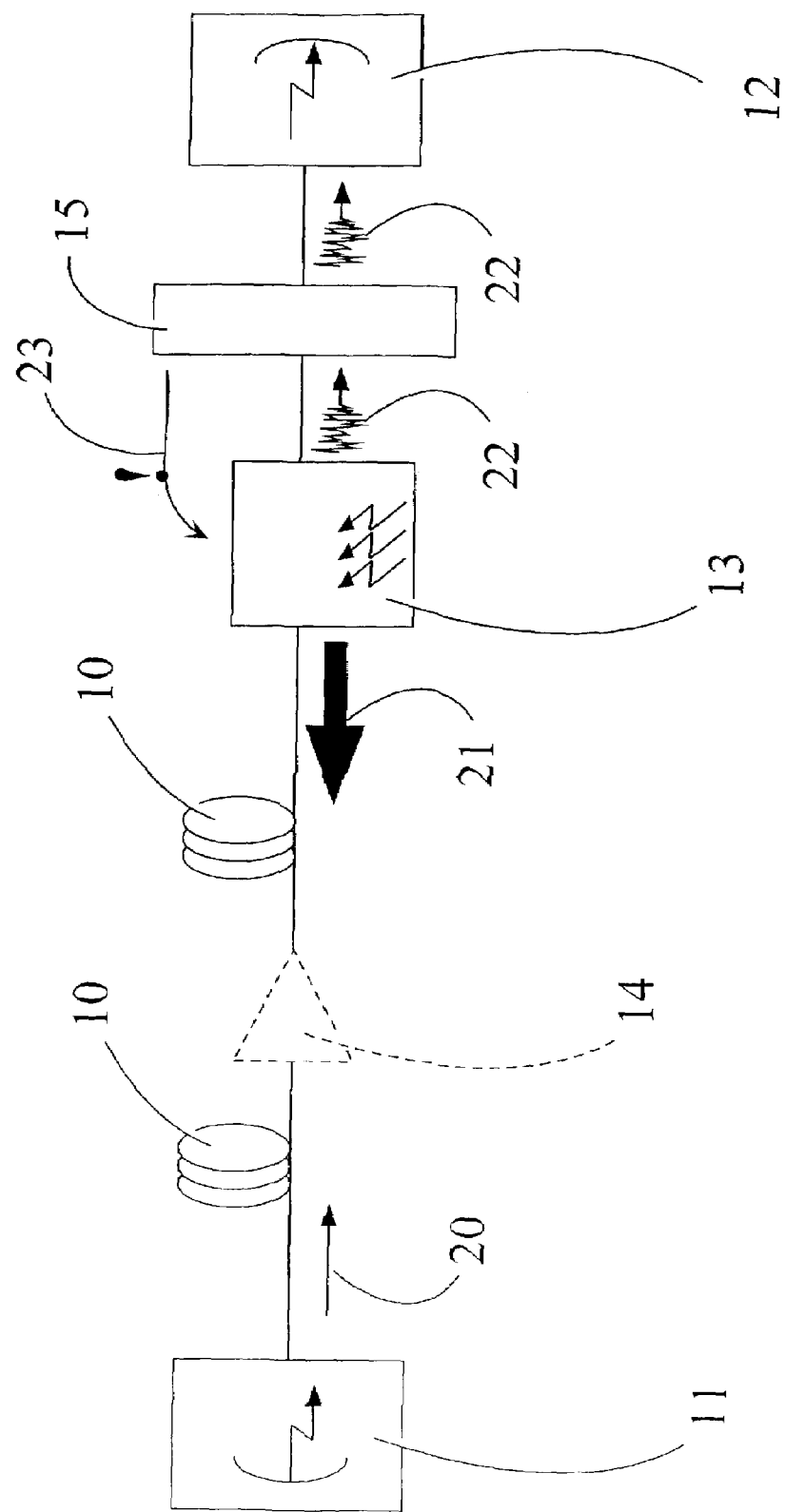

This insight is used as a basis of the invention. An example configuration of a fiber system, provided with the invented safety mechanism is depicted in FIG. 6. Between the pump source 13 and the receiver terminal 12 there is a safety interface 15 inserted into the fiber line 10. The safety interface 15 measures the total output power 22 and generates a shut-down signal 23 to shut down the pump source 13, if a decrease of the total output power of a predefined value $\Delta P_{max}$ occurs within a predefined time window $\Delta t$. In order to guarantee a fast shutdown, the time window is favourably selected in the range of msecs. In case of a fiber system showing the typical values of the table above, $\Delta P_{max}$ should be about 2 dB, while the time window $\Delta t$ should be set to about 1 msec.

The schematic drawing of the figures only show one single fiber. In reality a cable contains a number of fibers. Signals are launched into these fibers individually and each one of the fibers is pumped. According to the special application the safety mechanism can be carried out for each fiber individually or it can be restricted to one or several representative fibers per cable. Also according to the needs of the special application the shut-down of the pump source initiated by the failure of one fiber can concern the pump sources of all the fibers of the cable or be restricted to the one fiber, for which the failure has been detected.

The safety interface 15 is best placed between the pump source 13 and the receiver terminal 12 closed to the pump source 13 in order to have short ways for the transmission of the signal 23. However, it is also possible to place it somewhere else depending on the layout of the control elements involved.

There are many possible ways to translate the invented procedure into a concrete technical piece of hardware. E.g. the measurement of the total output energy can be carried out by means of a fast photodiode, detecting a fraction of light coupled out from the main fiber line. The time window $\Delta t$ can be predefined by electronic means, e.g. an RC-element, explicitely by an digital input element or by other means. Also, the critical decrease value $\Delta P_{max}$ can be predefined electronically, explicitely or by other means. It is possible to predefine several different time windows and generate the shut-down-signal 23, whenever a decrease of the total output power higher than the predefined critcal value occurs within any of them. One main object of the invented procedure is a avoid any damage due to an exposure to light leaking from a failure location of the fiber line. To this end the reaction time of the system should be made as short as possible, i.e. the time window should be selected very small. However, a cable break can occur as a result of a slowly increasing bending of the cable. A strong bending of a fiber increases the evanscent waves leaking from the fiber, which results in a slow decrease of the total output power. Thus the safety procedure could fail, if only a very short time window was defined. By the predefinition of several time windows, it can be made sure, that whatever event leads to a fiber line failure, the safety mechanism reliably works.

The safety mechanism explained above only leads to a shut-down of the pump source 13. In some cases it might be desirable also to shut down the transmitter terminal 11. Because of the long way between the safety interface 15 and the transmitter terminal 11 it is not possible to send the shut-down signal 23 to the transmitter terminal 11. Instead, the transmitter terminal 11 can be provided with a receiver element, optimized for the pump light wavelength, that would detect the loss of pump light and shut down the signal source. However, this additional safety mechanism is not generally applicable but only in certain cases, especially, when the fiber line is short enough to allow the pump light to travel the whole way back to the transmitter terminal.

The invention claimed is:

1. A safety procedure for optical fiber systems, transporting optical signals between a transmitter terminal and a receiver terminal, with at least one pump source to enhance said optical signal, by which safety procedure the optical input power fed into said optical fiber system is automatically shut off or at least reduced in case of an unintended escape of light from at least one fiber, wherein a safety interface is provided in the transmission line, said interface detecting changes of the total optical output power in at least one fiber to be received by said receiver terminal and initiating a shut-down of said input power as soon as a decrease of said total output power exceeding a predefined amount is detected within a predefined time window, wherein said predefined time window is about 1 ms.

2. Safety interface according to claim 1, wherein said predefined value is a value above a no signal value.

3. Safety procedure according to claim 1, wherein the optical fiber system is an unrepeated system with high energy pump sources.

4. Safety procedure according to claim 1, wherein in case of a safety shut-down all pump sources are shut down.

5. Safety procedure according to claim 1, wherein in case of a safety shut-down only the pump sources of those fiber are shut down, in which a failure has been detected.

6. Safety procedure according to claim 1, wherein in case of a safety shut-down also signal sources are shut down.

7. Safety procedure according to claim 1, wherein closed to or in the transmitter terminal a safety interface is provided, said interface detecting a portion of pump power per fiber, that reaches the transmitter terminal, and initiating a shut-down of the signal power as soon as a decrease of pump power exceeding a predefined value is detected.

8. Safety procedure according to claim 1, wherein at least one piece fiber amplifier is inserted in the fiber line.

9. Safety procedure according to claim 1, wherein more than one time window are predefined and the safety shut-down occurs a soon as a detected decrease of total output power exceeds the predefined value within any of said time windows.

* * * * *